(12) United States Patent
Kim et al.

(10) Patent No.: US 11,127,201 B2
(45) Date of Patent: Sep. 21, 2021

(54) METHOD FOR PROVIDING 3D GIS WEB SERVICES

(71) Applicant: GAIA3D INC., Daejeon (KR)

(72) Inventors: Hak Jun Kim, Daejeon (KR); Seong Do Son, Daejeon (KR)

(73) Assignee: GAIA3D INC., Daejeon (KR)

(*) Notice: Subject to any disclaimer, the term of this patent is extended or adjusted under 35 U.S.C. 154(b) by 391 days.

(21) Appl. No.: 16/076,137

(22) PCT Filed: Jan. 4, 2018

(86) PCT No.: PCT/KR2018/000195
§ 371 (c)(1),
(2) Date: Aug. 7, 2018

(87) PCT Pub. No.: WO2018/128424
PCT Pub. Date: Jul. 12, 2018

(65) Prior Publication Data
US 2021/0012566 A1 Jan. 14, 2021

(30) Foreign Application Priority Data

Jan. 4, 2017 (KR) .................. 10-2017-0001372
Jan. 4, 2017 (KR) .................. 10-2017-0001373

(51) Int. Cl.
*G06T 17/05* (2011.01)
*G06T 15/00* (2011.01)
*G06F 16/29* (2019.01)

(52) U.S. Cl.
CPC .............. *G06T 17/05* (2013.01); *G06F 16/29* (2019.01); *G06T 15/005* (2013.01)

(58) Field of Classification Search
CPC ....... G06T 17/20; G06T 17/205; G06T 15/04; G06T 11/40; G06T 15/005; G06T 15/08; G06T 17/00; G06T 19/00; G06T 15/40
See application file for complete search history.

(56) References Cited

U.S. PATENT DOCUMENTS 5,123,084 A 6/1992 Prevost et al.
8,284,190 B2 * 10/2012 Muktinutalapati ....... G06T 7/33
345/419

(Continued)

FOREIGN PATENT DOCUMENTS

KR 1020000050200 A 8/2000
KR 20030015765 A 2/2003
(Continued)

*Primary Examiner* — Todd Buttram
(74) *Attorney, Agent, or Firm* — Harness, Dickey & Pierce, P.L.C.

(57) ABSTRACT

The present disclosure relates a method for providing 3D GIS (Geographic Information System) web services using a web client and a server, the method including the steps of: in the server side, processing information to be transmitted to the web client; and in the server side, upon request of the web client, transmitting to the web client the information to be displayed on a screen of the web client. In the step of processing information, the information to be processed includes a main image and peripheral images around the main image, and the step of transmitting the information involves searching for a main image and peripheral images around the main image that corresponds to a request of the web client if the request includes information about an image to be visualized on the screen.

17 Claims, 17 Drawing Sheets

(56) References Cited

U.S. PATENT DOCUMENTS

| | | | |
|---|---|---|---|
| 8,847,954 B1* | 9/2014 | Lin | G06T 7/55 |
| | | | 345/424 |
| 2010/0306200 A1* | 12/2010 | Frank | G06F 16/70 |
| | | | 707/741 |
| 2013/0155058 A1* | 6/2013 | Golparvar-Fard | G06T 17/00 |
| | | | 345/419 |
| 2014/0228115 A1 | 8/2014 | Kaplan | |
| 2015/0023557 A1* | 1/2015 | Yoo | G06K 9/626 |
| | | | 382/103 |
| 2016/0189419 A1* | 6/2016 | Fakih | G06T 15/08 |
| | | | 345/419 |
| 2017/0372512 A1* | 12/2017 | Yang | G06T 15/04 |
| 2019/0114514 A1* | 4/2019 | Panciatici | G06K 9/00624 |
| 2019/0272665 A1* | 9/2019 | X | G06T 15/08 |

FOREIGN PATENT DOCUMENTS

| | | |
|---|---|---|
| KR | 20040049832 A | 6/2004 |
| KR | 100452089 B1 | 9/2004 |
| KR | 20060063187 A | 6/2006 |
| KR | 20060089901 A | 8/2006 |
| KR | 20160062294 A | 6/2016 |
| KR | 20160137201 A | 11/2016 |

* cited by examiner

Prior Art

Prior Art

Prior Art

Prior Art

Prior Art

| Surface direction | Internal object ID seen in the corresponding first sub-cube |
|---|---|
| ... | ... |
| $C_{i,j,k}$ | 1034, 1035, 1036, ... |
| $C_{i+1,j,k}$ | 1033, 1034, 1037, ... |
| $C_{i+2,j,k}$ | 1037, 1038, 1039, ... |
| ... | ... |

FIG. 13

| Surface direction | Internal object IDs included in the corresponding second sub-cube |
|---|---|
| ... | ... |
| $O_{z,y,x}$ | 554, 555, 558, ... |
| $O_{z+1,y,x}$ | 605, 608, 612, ... |
| $O_{z+2,y,x}$ | 1011, 1020, 1025, ... |
| ... | ... |

FIG. 14

| Surface direction | Internal object IDs included in the corresponding second sub-cube | Visibility index for each space index | |
|---|---|---|---|
| ... | ... | ... | |
| $O_{z,j,k}$ | 554, 555, 553, ... | ... | ... |
| | | $C_{j,k}$ | 554, 553, ... |
| | | $C_{-1,j,k}$ | 554, 555, 556, ... |
| | | $C_{-2,j,k}$ | 553, ... |
| | | ... | ... |
| $O_{x-1,j,k}$ | 605, 809, 612, ... | ... | ... |
| | | $C_{j,k}$ | none |
| | | $C_{-1,j,k}$ | none |
| | | $C_{-2,j,k}$ | 605, 612 |
| | | ... | ... |
| $O_{x-2,j,k}$ | 1011, 1020, 1025, ... | ... | ... |
| | | $C_{j,k}$ | 1011, ... |
| | | $C_{-1,j,k}$ | 1011, 1020, 1025, ... |
| | | $C_{-2,j,k}$ | 1020, 1025, ... |
| | | ... | ... |
| ... | ... | ... | |

FIG. 16

METHOD FOR PROVIDING 3D GIS WEB SERVICES

CROSS-REFERENCE TO RELATED APPLICATIONS

This application is a National Phase application of PCT Application No. PCT/KR2018/000195 filed on Jan. 4, 2018 which claims priority to Korean Patent Application No. 10-2017-0001372 filed on Jan. 4, 2017 and Korean Patent Application No. 10-2017-0001373 filed on Jan. 4, 2017. The entire disclosures of the applications identified in this paragraph are incorporated herein by reference.

FIELD

The present disclosure is generally relates to a method for providing 3D GIS (Geographic Information System) web services, and in particular, to a method for providing 3D GIS web services with reduced response time or a higher speed of response, and a method for providing 3D GIS web services that visualize images containing geographic information by using a panoramic photography technique.

BACKGROUND

This research was supported by a grant (number: 19NSIP-B080778-06) from National Spatial Information Research Program (NSIP) funded by Ministry of Land, Infrastructure and Transport of Korean government.

This section provides background information related to the present disclosure which is not necessarily prior art.

GIS (Geographic Information System) refers to a system that handles geospatial data (e.g. Korean Patent Application Laid-Open No. 10-2010-0013059).

Generally, in a 2D GIS web service environment, a server sends a web client data including an image to be drawn on the screen, and the web client then draws the image directly.

With continued development in GIS, however, the 2D GIS web service system now has to handle a larger capacity image data, and the web client in turn takes longer work time to directly draw an image using such an increased amount of the image data received from the server.

Later, the 2D GIS web service system adopted a new scheme in which the server pre-draws an image to be visualized, and when the web client sends the server a request for image data, the server provides the pre-drawn image to the web client.

According to this new scheme, since the server provides the web client with an image to be visualized on the screen of the web client, the web client always receives image data of a uniform size, despite an increase in the amount of images to be visualized on the screen of the web client. Moreover, the web client can be ensured to have a uniform work time as it only needs to perform drawing on the screen for those image data sent from the server.

If a view position changes, e.g. if the screen is operated by changing the position of a camera for example and the screen is updated accordingly, the web client requests the server for image data and performs drawing an image to be visualized on the screen after receiving the requested image data. The web client may send a request for new image data to update the screen after the operation of the screen is ended. Alternatively, when the screen is being operated, the web client may perform drawing an image by re-using the existing image data received previously.

To illustrate as an example, when the screen is zoomed out, e.g. when the position of a camera looking towards the ground is changed such that the camera is now looking up in the opposite direction of the ground, the actual geographic area to be shown on the screen gets broader. In order to visualize data in every visualization zone on the screen even during the zoom-out operation, the web client should keep requesting the server for new data to update the screen during the zoom-out operation and continue to draw upon receiving the new data.

However, when the screen shown in FIG. 1(a) is zoomed out as in FIG. 1(c), the other areas except for a target area to be zoomed out are left blank during a zoom-out operation as shown in FIG. 1(b) as the web client initiates drawing. Upon receiving new image data requested, the web client then updates the zoomed-out screen as shown in FIG. 1(c). The image shown on the screen during the zoom-out operation is a zoomed-out, re-used image from the one used for visualization prior to the zoom-out operation. In other words, image data that was previously received is simply re-used and visualized.

On the other hand, when the display screen shown in FIG. 2(a) is zoomed in as shown in FIG. 2(c), an image used for visualization just before a zoom-in operation is re-used, and a specific portion of the image is zoomed in and visualized at a lower resolution during the zoom-in operation. After the screen zoom-in operation is completed, the web client requests the server for a high-resolution image, which is a new target to be visualized, and then visualizes the image thus received.

In a 3D GIS web service system used nowadays, when the web client sends a request, the server provides 3D image data directly to the web client, and the web client then draws images of the 3D image data received. As 3D image data has a greater amount than 2D image data and requires a higher performance level for drawing, it is crucial to improve the performance in general.

As described above, the 2D GIS web service system and the 3D GIS web service system are basically operated in similar ways in that when the web client sends a request, the server provides image data to the web client and the web client then draws images of the received data on the screen.

Further, in the 3D GIS web service system, the server pre-draws an image of the image data to be visualized on the screen and then provides the image to the web client, or the web client can request the server for new image data for visualization only after the operation of the screen of the web client is completed, discouraging the web client from requesting for image data too frequently, as in the 2D GIS web service system.

However, re-using data that was received prior to the operation of the screen of the web client for visualization while the screen of the web client is being operated can only be applicable in the 2D GIS web service system, not in the 3D GIS web service system because of the reasons below.

Firstly, blank zones that appear during the operation of the screen substantially lowers the visibility in the 3D system than in the 2D system.

Secondly, as the system processes simple 2D translation of a 3D object, the location of the object visualized on the screen during its operation is changed to the location of the object visualized on the updated screen after the operation thereon is completed, creating a discrepancy between the locations. For example, FIG. 3(a) shows a screen before a camera is moved, and FIG. 3(c) shows a screen after the camera is operated and moved, with FIG. 3(b) being in the transition stage. A portion indicated by 13 shown on the screen of FIG. 3(a) is not shown on the screen of FIG. 3(c). This illustrates a difference between the 2D and 3D web service systems.

Moreover, 3D data visualization (3D rendering) in a 3D GIS web service certainly requires high-performance operations, and a thin client (web client) based on a web browser is used as a service client in the GIS web service. This implies that it would be very hard to handle 3D GIS data in the field of GIS web services because 3D GIS data handling usually involves modeling a large area such as high-rise buildings/streets/major facilities typically found in a big city or topography of the land, and almost all of the 3D GIS data is heavy and has a very large capacity. Therefore, it is rather natural and logical to have the data server provide pre-optimized data to the service client if the service client requests the server for 3D GIS data, such that the service client is allowed to handle only a minimum data that is absolutely necessary.

A number of techniques are available for use in the optimization of 3D GIS data provided to the service client, and culling 3D objects that are shown on the screen is another good approach as one of those techniques employed in other conventional fields of 3D rendering. Among others, occlusion culling, which is a feature that culls 3D objects located behind as they are obscured by other 3D objects located in front of them, is highly suitable for optimizing 3D GIS data. It would be very reasonable to assume that in GIS web services handling at least city-scale GIS data, much more 3D objects are likely to be removed by occlusion culling.

The field of video games will be the one where the majority of technologies have been developed and are currently being applied to improve the performance of 3D rendering. Needless to say, occlusion culling is often used in video games, and there are many different kinds of occlusion culling methods being designed. However, these occlusion culling methods for gaming are reported to cause problems to be used directly in 3D GIS web services. Those problems occur due to differences described below between a game program and a GIS service client.

Firstly, any video game performing heavy 3D rendering usually uses a high-performance thick client as its dedicated client (e.g. ".exe" or ".dll" files operated in a PC).

Secondly, even for an online game, most of heavy 3D object data should be installed at the time of installing the game. In doing so, a game client does not have to handle the data while communicating with the server during runtime.

Thirdly, as 3D space within the game is divided by scenes, the game client always performs 3D rendering on only a particular scene. If the scene changes, the game client releases resources allocated for the pre-existing scenes and reads data necessary for a next scene (i.e. zone loading). Game users are also familiar with this zone loading. That is, they use the occlusion culling method optimized within a certain defined space.

However, the occlusion culling method specialized for zone loading might not be a good option for use in the 3D GIS web service where the camera must continuously work among 3D modeled objects of an actual city or geography.

DISCLOSURE

Technical Problem

The problems to be solved by the present disclosure will be described in the latter part of the best mode for carrying out the invention.

Technical Solution

This section provides a general summary of the present disclosure and is not a comprehensive disclosure of its full scope or all of its features.

According to one aspect of the present disclosure, there is provided a method for providing 3D GIS (Geographic Information System) web services using a web client and a server, the method including the steps of: in the server side, processing information to be transmitted to the web client; and in the server side, upon request of the web client, transmitting to the web client the information to be displayed on a screen of the web client. In the step of processing information, the information to be processed includes a main image and peripheral images around the main image, and the step of transmitting the information involves searching for a main image and peripheral images around the main image that corresponds to a request of the web client if the request includes information about an image to be visualized on the screen.

According to another aspect of the present disclosure, there is provided a method for providing 3D GIS web services using a web client and a server, the method comprising the steps of: in the server side, processing information to be transmitted to the web client; and in the server side, upon request of the web client, transmitting to the web client the information to be displayed on a screen of the web client, wherein in the step of processing information, the information to be processed includes information about a building, and the information about a building is processed with a visibility index for each space index by setting at least one first sub-cube and at least one second sub-cube for the building, and indexing an object located within a corresponding second sub-cube seen from a camera that is supposedly located within each of the first sub-cubes.

Advantageous Effects

The advantageous effects of the present disclosure will be described in the latter part of the best mode for carrying out the invention.

BRIEF DESCRIPTION OF DRAWING

FIG. 11, FIG. 12 and FIG. 13 illustrates examples of a method for defining a visibility index according to the present disclosure.

FIG. 14, FIG. 15A and FIG. 15B illustrate examples of a method for defining a space index according to the present disclosure.

FIG. 16 and FIG. 17 illustrate other examples of a method for defining a visibility index according to the present disclosure.

DETAILED DESCRIPTION

The present disclosure will now be described in detail with reference to the accompanying drawings, without limiting it thereto.

Figure 1A:
FIG. 1A, FIG. 1B and FIG. 1C illustrates an example of the zoom-out operation in the 2D GIS web service system.
Figure 1B:
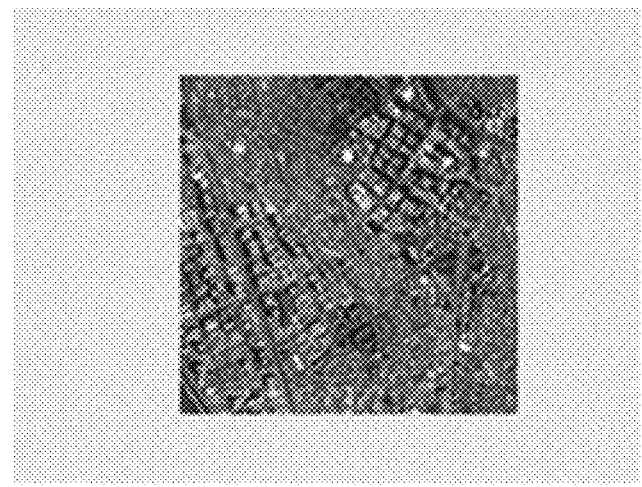
Figure 1C:
Figure 2A:
FIG. 2A, FIG. 2B and FIG. 2C illustrates an example of the zoom-in operation in the 2D GIS web service system.
Figure 2B:
Figure 2C:
Figure 3A:
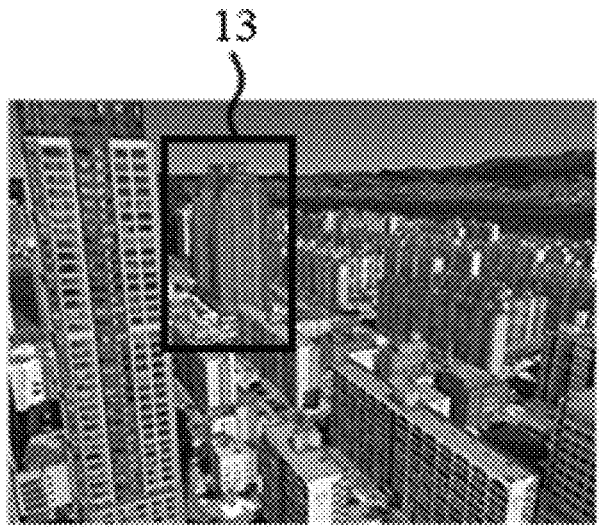
FIG. 3A, FIG. 3B and FIG. 3C illustrates an example of incorporating the 2D GIS web service system into the 3D GIS web service system.
Figure 3B:
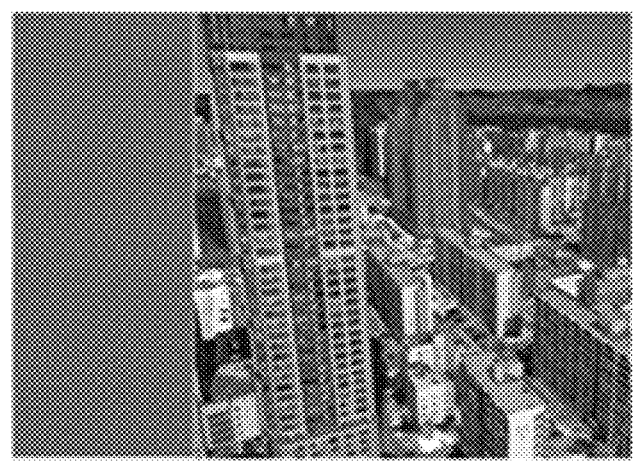
Figure 3C:
Figure 4:
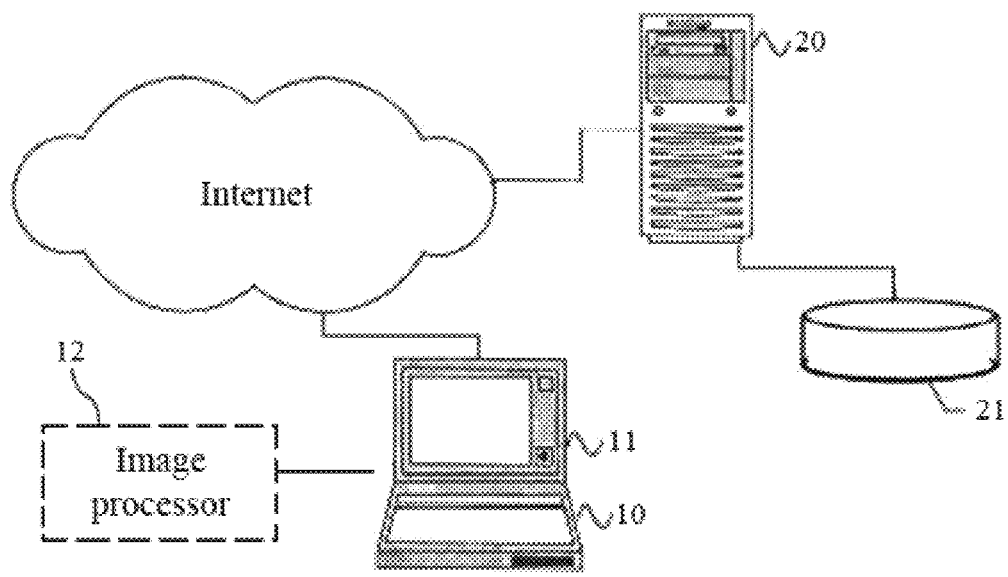
FIG. 4 illustrates an example of the overall configuration of the 3D GIS web service system according to the present disclosure.

FIG. 4 illustrates an example of the overall configuration of the 3D GIS web service system according to the present disclosure. The web service system of the disclosure uses a web client 10 and a server 20 for providing 3D GIS web services.

The web client 10 (e.g. a PC) cooperates with the server 20 in a manner that the web client 10 can display, through a visualization operation, information transmitted from the server 20 on a screen 11 provided to the web client 10.

When the web client 10 requests the server 20 for information to be displayed on the screen 11, the server 20 transmits to the web client 10 a main image and peripheral images that were taken by a camera before at corresponding locations. The server 20 herein refers to a means including both hardware and software in the server 20, such as, a data storage 21 provided in the server 20. The data storage 21 can store images taken by the camera.

The main image refers to an image of a view directly in front of the fixed camera, and the peripheral images refer to images of views around the main image, taken by the camera rotating in up, down, left and right directions, as shown in FIG. 5. In other words, the main image is the photographed image of a view which the fixed camera is currently looking at.

Figure 5A:
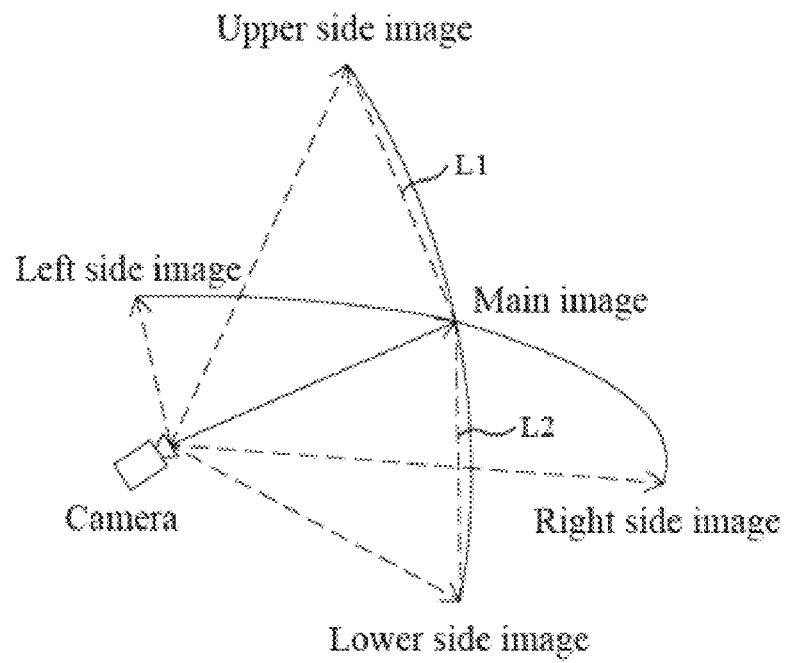
FIG. 5A, FIG. 5B and FIG. 6 illustrate examples of imaging the information to be processed according to the present disclosure.

In the present disclosure, as shown in FIG. 5(a), a distance L1 from the main image as the center to an upper side image is preferably set equal to a distance L2 from the main image to a lower side image. As an alternative, though, the distance L1 to the upper side image and distance L2 to the lower side image from the main image as the center may be set different from each other.

Figure 5B:
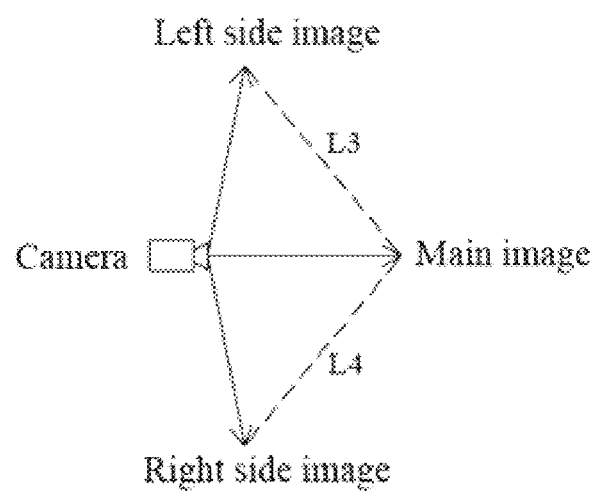

Similarly, as shown in FIG. 5(b), a distance L3 from the main image as the center to a left side image can be set equal to a distance L4 from the main image to a right side image, but they are not limited thereby.

In the present disclosure, the main image and peripheral images are preferably taken by a panoramic photography technique. That is, the main and peripheral images can include images captured with a camera in a 360-deg rotation.

The panoramic photography technique obtains images by fixing the camera in a specific place for shooting, and then spinning the camera in up, down, left and right directions around the front view. Regardless of the sequence of shooting directions, the main and peripheral images may be captured simultaneously using individual cameras, or sequentially using one camera.

As described previously, upon receiving a request from the web client 10, the server 20 transmits, to the web client 10, information to be displayed on the screen 10 of the web client 10. In particular, the server 20 transmits, to the web client 10, the main image, and at least the upper, lower, left and right side images around the main image.

Figure 6:
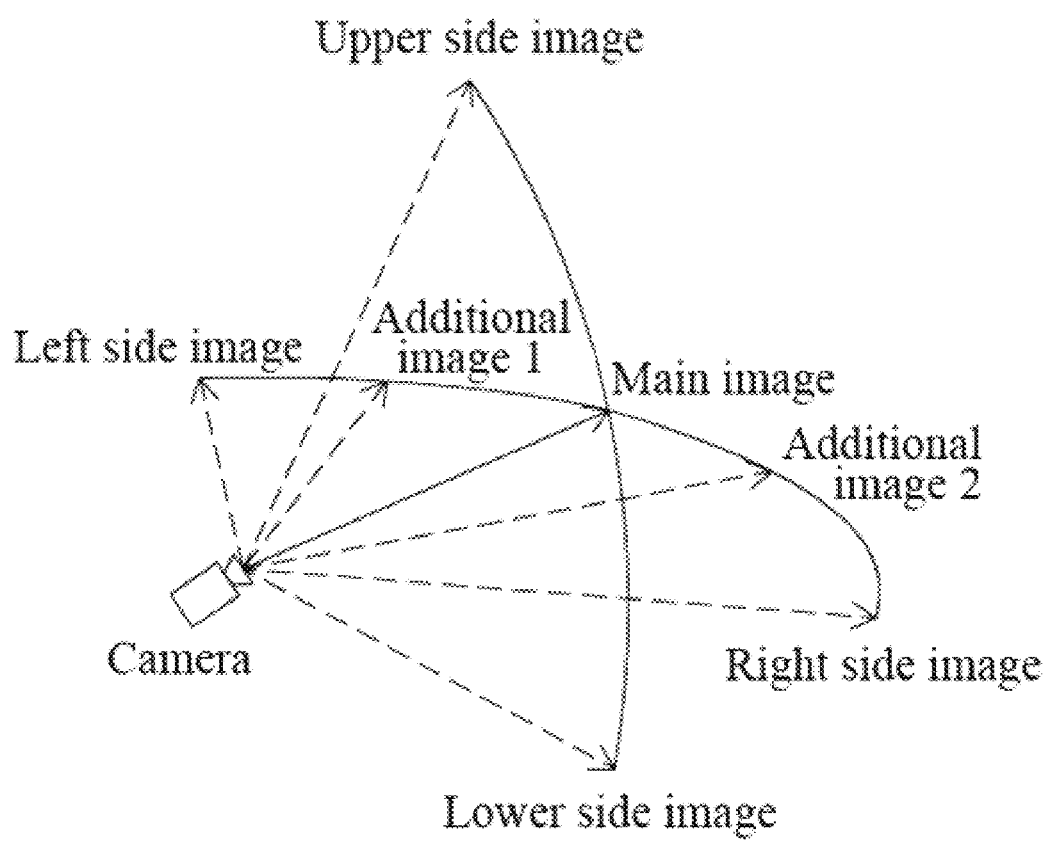

In case the web client 10 zooms in the screen 10, the server 20 may also store additionally captured images between the main image and the peripheral images. As shown in FIG. 6, the server 20 has additional images located between the main image and at least one of the upper, lower, left and right side images around the main image.

As the number of additional images is increased, an amount of data to be provided by the server 20 is also increased. In this case, the amount of data can be reduced by taking those images at a lower resolution. This is possible because users do not feel much inconvenient to have low resolution image data during the operation of the screen, as in the 2D GIS web service system.

The web client 10 receives main and peripheral images from the server 20, searches for a main image and relevant peripheral images corresponding to the location of the camera, and then displays on its screen 11 the images visualized through an image processor 12.

Figure 7A:
FIG. 7A and FIG. 7B illustrates an example of the screen visualized through the 3D GIS web service system according to the present disclosure.
Figure 7B:

In particular, when the server 20 transmits main and peripheral images to the web client 10, the image processor 12 merges the main image and the peripheral images captured along the rotation directions of the camera, and the web client 10 performs geometric correction and interpolation on the merged image for visualization. For instance, referring to FIG. 7, when the user swipes the screen to the left, those previously received main image, left side image and additional image located between the main and left side images are merged, undergo the correction and interpolation operations for visualization and then are displayed on the screen 11.

Figure 8:
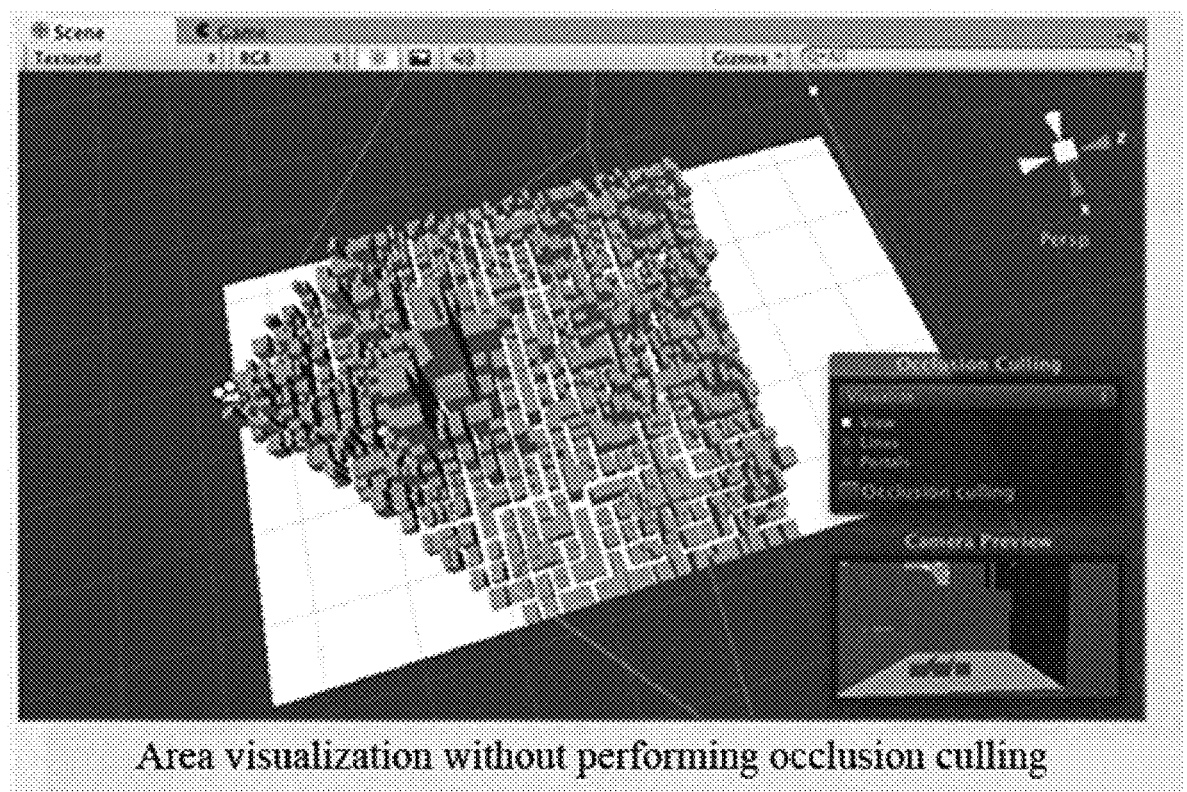
FIG. 8 illustrates an example of the screen visualized without performing occlusion culling on GIS data.
Figure 9:
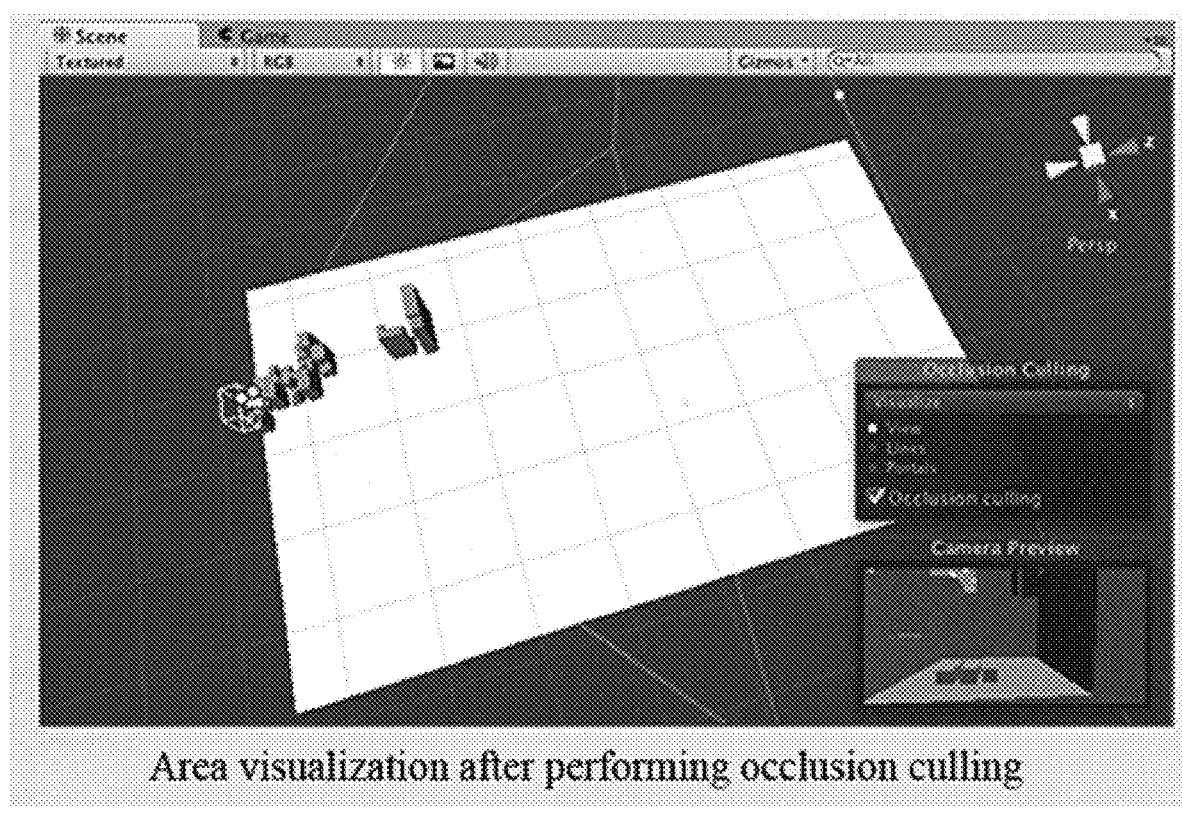
FIG. 9 illustrates an example of the screen visualized by performing occlusion culling on GIS data.

FIG. 8 and FIG. 9 illustrate an example of the screen visualized without performing occlusion culling on GIS data, and an example of the screen visualized by performing occlusion culling on GIS data, respectively.

To provide 3D GIS web services, occlusion culling can be useful for improving the performance of the web client. As mentioned earlier, however, this is not enough. The 3D GIS web service performance can be improved by assisting the occlusion culling operation not only with 3D geospatial data but also with a visibility index for a building on the 3D geospatial data according to the present disclosure.

Figure 10:
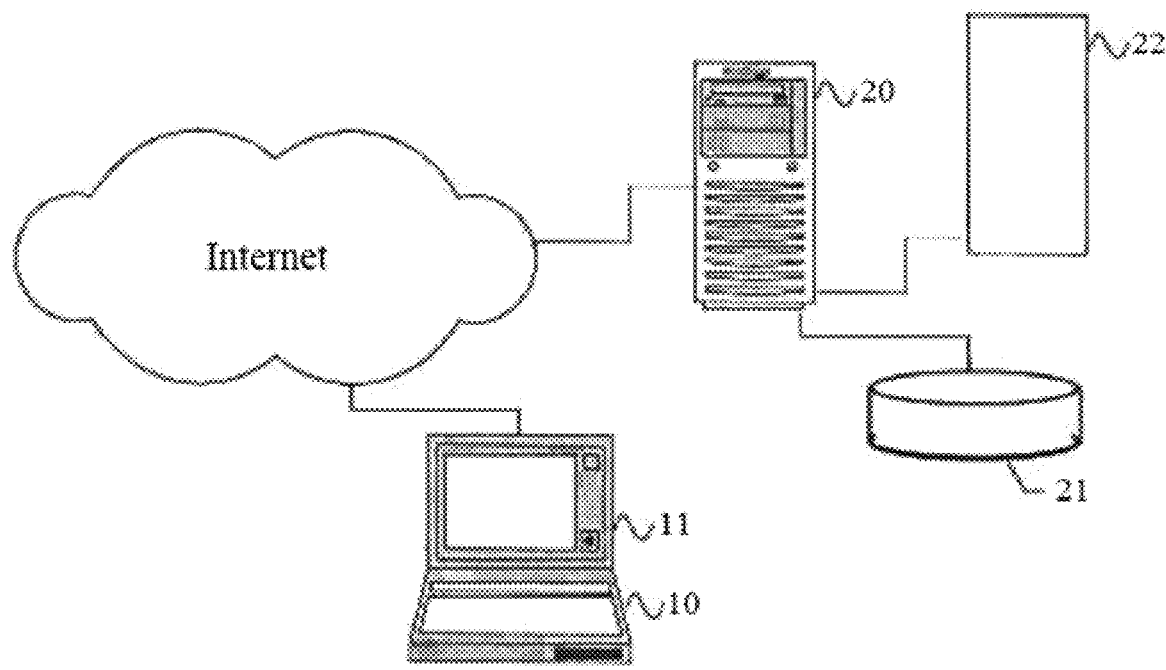
FIG. 10 illustrates another example of the overall configuration of the 3D GIS web service system according to the present disclosure.

FIG. 10 illustrates another example of the overall configuration of the 3D GIS web service system according to the present disclosure, in which a web client 10 and a server 20 are used for the web service.

The web client 10 (e.g. a PC) cooperates with the server 20 in a manner that the web client 10 can display information transmitted from the server 20 on a screen 11 provided to the web client 10. Normally, when the web client 10 requests the server 20 for data about the interior of a specific building to be drawn on the screen 11, the server 20 searches the full data set of the building of interest and extracts necessary data from it (e.g. which internal objects of the building should be drawn). With visibility index information for each space index according to the present disclosure, however, the server 20 now has a significantly narrowed range of targets to be searched and extracted, which in turn substantially reduces the run time of the server.

The server 20 herein refers to a means including both hardware and software in the server 20, such as, a data storage 21 and a visibility index processor 22 provided in the server 20.

Figure 11:
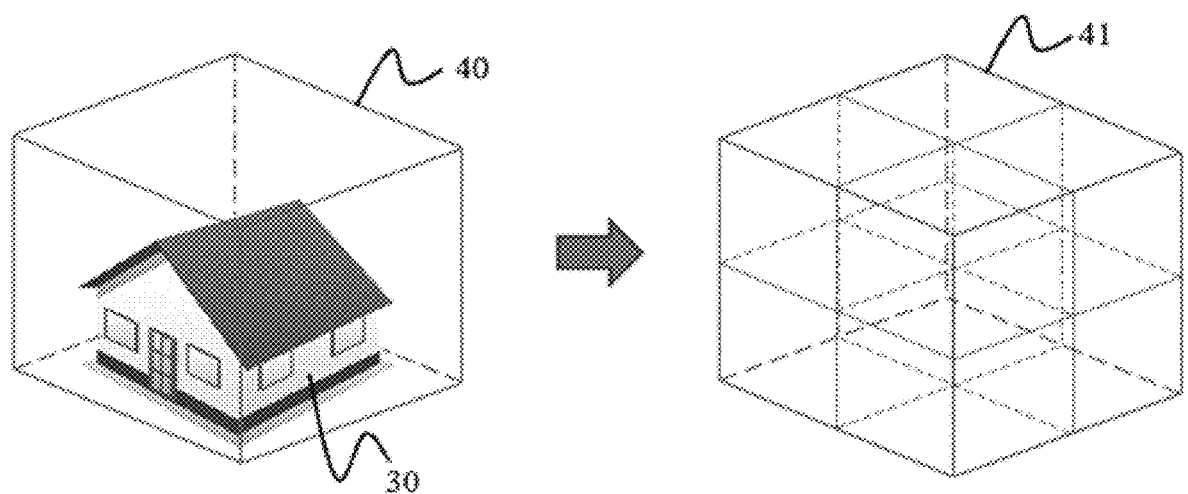
Figure 12:
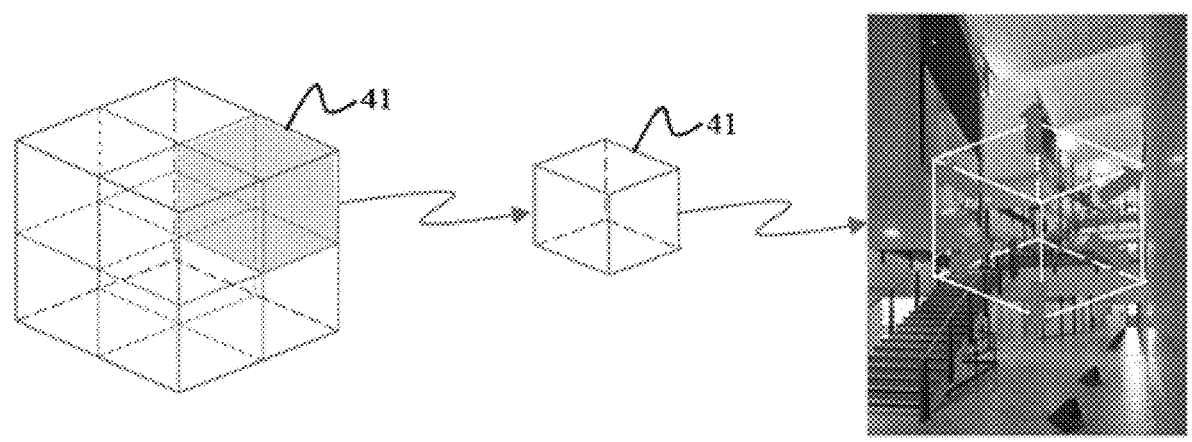

FIG. 11 through FIG. 13 illustrate examples of a method for defining a visibility index according to the present disclosure. Referring first to FIG. 11, a first main cube 40 surrounding a specific building 30 is set, and the first main cube 40 is split into $2^n$ cubes along the length, width and height directions. The first main cube 40 is then cut along a plane perpendicular to each side, passing a corresponding split point to obtain $8^n$ first sub-cubes 41. For example, if n=1, 8 sub-cubes are obtained. Each of the first, sub-cubes 41 being divided is designated as a space with a visibility index.

Referring next to FIG. 12, suppose that a camera is located at the core of the first sub-cube 41 (Cijk, the i-th (length direction), j-th (width direction) and k-th (height direction), first sub-cube), and that the camera captures images outside the first sub-cube 41 in the directions (see the arrows) normal to six surfaces (east, west, south, north, top and bottom) that constitute the first sub-cube 41. Only those internal objects of the building taken on the scene are recorded as illustrated in FIG. 13.

This defines a visibility index of the present disclosure, namely, the visibility index of the first sub-cube 41 (Cijk).

Figure 15A:
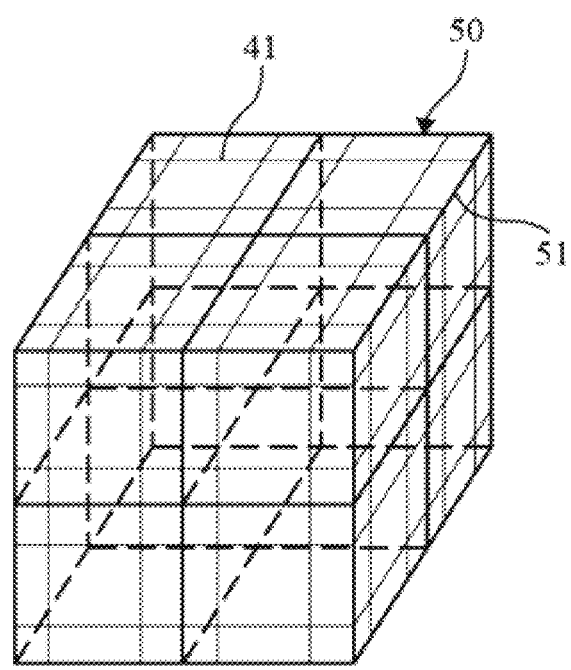
Figure 15B:
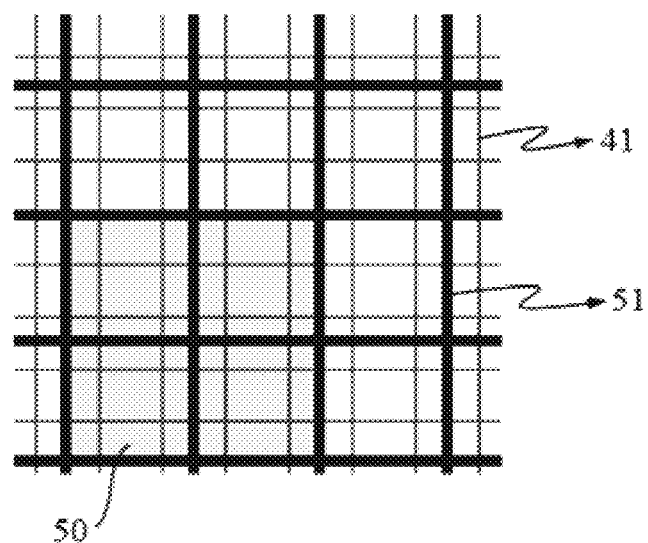

FIG. 14 and FIG. 15 illustrate examples of a method for defining a space index according to the present disclosure. First of all, similar to FIG. 11, a second main cube 50 surrounding a specific building 30 and having a different size from the first main cube 40 is set, and the second main cube 50 is split into 2n cubes along the length, width and height directions. The second main cube 50 is then cut along a plane perpendicular to each side, passing a corresponding split point to obtain 8n second sub-cubes 51. For example, if n=1, 8 sub-cubes are obtained. Each of the second, sub-cubes 51 being divided is designated as a space with a space index.

In these examples, the second main cube 50 and the second sub-cubes 51 are preferably set in the same manner as in the first main cube 40 and the first sub-cubes 41 described earlier.

Next, suppose that a camera is located at the core of the second sub-cube 51 (Oxyz, the x-th (length direction), y-th (width direction) and z-th (height direction), second sub-cube), and that the camera captures images outside the first sub-cube 41 in the directions (see the arrows) normal to six surfaces (east, west, south, north, top and bottom) that constitute the second sub-cube 51. Only those internal objects of the building taken on the scene are recorded as illustrated in FIG. 14.

This defines a space index of the present disclosure, namely, the space index of the second sub-cube 51 (Oxyz).

The second sub-cube 51 has information regarding what internal objects of the building exist in which area. Therefore, the visibility index of the first sub-cube 41 for the interior of the building is included in the space index of the second sub-cube 51.

Referring now to FIG. 15, in the present disclosure, the second main cube 50 is preferably formed in larger dimensions than the first main cube 40, and the second sub-cubes 51 are also preferably formed in larger dimensions than the first sub-cubes 41.

To be more specific, a short moving distance is set for the camera in the first sub-cubes 41 since they store visibility indexes varyingly seen according to locations of the camera, while a moving distance set for the camera in the second sub-cubes 51 is longer than the moving distance set for the camera in the first sub-cubes 41 since the second sub-cubes store space indexes of a building according to locations of the camera.

Figure 17:
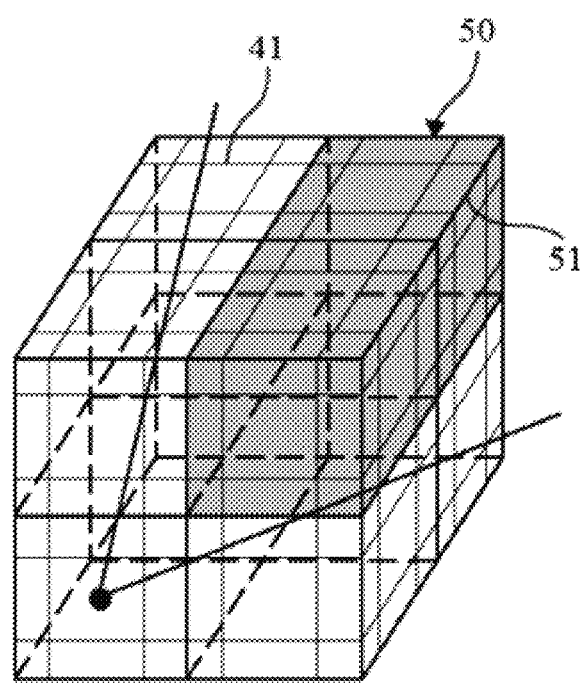

FIG. 16 and FIG. 17 illustrate other examples of a method for defining a visibility index according to the present disclosure. First of all, as the web client 10 (see FIG. 10) sends the server 20 a location and shooting direction of the camera while requesting information about the interior of a building to be visualized, the server 20 determines from the location of the camera in which first sub-cube 41 the camera is placed, and searches for one surface spanning across the screen out of the 6 surfaces from the shooting direction. Only the visibility index of a corresponding first sub-cube 41 and the space index of a second sub-tube 51 positioned in an overlapping arrangement with the first sub-cube 41 are post-processed and then transmitted to the web client.

To be more specific, as shown in FIG. 16, when the camera is located within the first sub-cube 41, the server searches for an internal object, as seen from the camera, where the space index of a corresponding second sub-cube 51 and the visibility index of a first sub-cube 41 located within the second sub-cube 51 overlap each other, as seen from the camera.

Next, for indexing, the server performs the culling operations, i.e. frustum culling followed by occlusion culling, on the internal object where the first sub-cube 41 and the second sub-cube 51 overlap each other.

To be more specific, the internal object where the first sub-cube 41 and the second sub-cube 51 overlap each other is indexed through the frustum culling operation that does not visualize an object outside the shooting zone of the camera shown in FIG. 17.

The following describes various exemplary embodiments of the present disclosure.

(1) A method for providing 3D GIS (Geographic Information System) web services using a web client and a server, the method comprising the steps of: in the server side, processing information to be transmitted to the web client; and in the server side, upon request of the web client, transmitting to the web client the information to be displayed on a screen of the web client, wherein in the step of processing information, the information to be processed includes information about a building, and the information about a building is processed with a visibility index for each space index by setting at least one first sub-cube and at least one second sub-cube for the building, and indexing an object located within a corresponding second sub-cube seen from a camera that is supposedly located within each of the first sub-cubes.

A typical example of the web client is a PC, but is not limited thereto. Any computing means capable of displaying 3D map information thorough a screen, e.g. a mobile phone, can be used for the web client. This series of steps is an internal procedure of the server-side computer and carried out by a software thereof.

(2) The method for providing 3D GIS web services of (1), wherein the request of the web client includes information about a location and shooting direction of the camera, and the web client searches for a main image and peripheral images received from the server based on the location and shooting direction of the camera.

(3) The method for providing 3D GIS web services of (2), wherein the peripheral images include at least one of upper, lower, left and right side images around the main image.

(4) The method for providing 3D GIS web services of (3), wherein the peripheral images further include an additional image located between the main image and at least one of the upper, lower, left and right side images.

(5) The method for providing 3D GIS web services of (3), wherein in the step of transmitting the information, a main image and peripheral images taken along the rotation directions of the camera are visualized on the screen through an image processing process.

(6) The method for providing 3D GIS web services of (5), wherein the image processing process involves merging the main image and the peripheral images taken along the rotation directions of the camera, and then visualizing the merged image through geometric correction and interpolation.

(7) The method for providing 3D GIS web services of (3), wherein a distance from the main image to the upper side image equals to a distance from the main image to the lower side image.

(8) The method for providing 3D GIS web services of (3), wherein a distance from the main image to the left side image equals to a distance from the main image to the right side image.

(9) The method for providing 3D GIS web services of (1), wherein the main image and the peripheral images are taken by a panoramic photography technique.

(10) The method for providing 3D GIS web services of (9), wherein the panoramic photography technique uses cameras to take the main image and the peripheral images, respectively, at the same time.

(11) The method for providing 3D GIS web services of (9), wherein the panoramic photography technique uses one camera to take the main image and the peripheral images in a sequence.

(12) A method for providing 3D GIS web services using a web client and a server, the method comprising the steps of: in the server side, processing information to be transmitted to the web client; and in the server side, upon request of the web client, transmitting to the web client the information to be displayed on a screen of the web client, wherein in the step of processing information, the information to be processed includes information about a building, and the information about a building is processed with a visibility index for each space index by setting at least one first sub-cube and at least one second sub-cube for the building, and indexing an object located within a corresponding second sub-cube seen from a camera that is supposedly located within each of the first sub-cubes.

Here, the first and second sub-cubes can each be one or plural, and if they are one, the main cube itself is a sub-cube. It is preferable that the main cube and the sub-cubes preferably have length/width/height of equal dimensions, but it is not absolutely required. A typical example of the web client is a PC, but is not limited thereto. Any computing means capable of displaying 3D map information thorough a screen, e.g. a mobile phone, can be used for the web client. This series of steps is an internal procedure of the server-side computer and carried out by a software thereof.

(13) The method for providing 3D GIS web services of (12), wherein in the step of processing information, the information about a building is processed with a visibility index for each space index by indexing a visibility index of one of first sub-cubes having visibility indexes that overlap with a corresponding one of second sub-cubes having space indexes.

(14) The method for providing 3D GIS web services of (12), wherein the visibility index of the first sub-cube is seen from the camera through surfaces that constitute the first sub-cube.

(15) The method for providing 3D GIS web services of (12), wherein the visibility index is seen, through the surfaces of a respective first sub-cube, from a camera that is supposedly located within each of 8n first sub-cubes obtained by having a plane pass a corresponding split point, with each split point splitting a first main cube set around a building into 2n cubes along the length, width and height directions.

(16) The method for providing 3D GIS web services of (12), wherein the space index of the second sub-cube is seen from the camera through the surfaces that constitute the second sub-cube.

(17) The method for providing 3D GIS web services of (12), wherein the space index is placed within a respective first sub-cube, as seen from a camera that is supposedly located within each of 8n second sub-cubes obtained by having a plane pass a corresponding split point, with each split point splitting a second main cube set around a building into 2n cubes along the length, width and height directions.

(18) The method for providing 3D GIS web services of (12), wherein the step of transmitting the information involves searching for a first sub-cube located within a second sub-cube that corresponds to a request of the web client if the request includes information about the interior of the building to be visualized on the screen.

(19) The method for providing 3D GIS web services of (18), wherein the request of the web client includes information about a location and shooting direction of the camera, and the server searches for a first sub-cube that overlaps with a corresponding second sub-cube based on the location and shooting direction of the camera.

(20) The method for providing 3D GIS web services of (12), wherein the first sub-cube has smaller dimensions than the second sub-cube.

(21) The method for providing 3D GIS web services of (12), wherein in the step of transmitting the information, the information to be transmitted undergoes occlusion culling.

(22) The method for providing 3D GIS web services of (12), wherein in the step of transmitting the information, the information to be transmitted undergoes frustum culling followed by occlusion culling.

The method for providing 3D GIS web services according to the present disclosure is advantageous for providing a 3D GIS web service, which has an improved response speed.

The method for providing 3D GIS web services according to the present disclosure is advantageous for providing a 3D GIS web service, which visualizes an image taken by a panoramic photography technique capable of capturing the image with a camera in a 360-deg rotation.

The method for providing 3D GIS web services according to the present disclosure is advantageous for providing a 3D GIS web service, which re-uses previously received images to visualize an image to be displayed on the screen.

The method for providing 3D GIS web services according to the present disclosure is advantageous for providing a 3D GIS web service, which uses a visibility index defined by indexing a space index as well as a visibility index.

The method for providing 3D GIS web services according to the present disclosure can effectively provide frustum culling followed by occlusion culling.

What is claimed is:

1. A method for providing 3D GIS (Geographic Information System) web services using a web client and a server, the method comprising the steps of:
   in the server side, processing information to be transmitted to the web client; and
   in the server side, upon request of the web client, transmitting to the web client the information to be displayed on a screen of the web client,
   wherein in the step of processing information, the information to be processed includes information about a building, and the information about a building is processed by indexing an object seen from a camera that is supposedly located within each of at least one of sub-cubes set for the building, wherein in the step of processing information, the information to be processed includes information about a building, and the information about a building is processed by indexing an object seen through the surfaces of a respective sub-cube, as seen from a camera that is supposedly located within each of $8^n$ sub-cubes obtained by having a plane pass a corresponding split point, each split point splitting a main cube set around a building into $2^n$ cubes along the length, width and height directions, and wherein n is a natural number.

2. The method for providing 3D GIS web services according to claim 1, wherein in the step of processing information, the information about a building is processed by indexing an object seen from the camera through surfaces that constitute the sub-cube.

3. The method for providing 3D GIS web services according to claim 1, wherein the step of transmitting involves searching for a sub-cube that corresponds to a request of the web client if the request includes information about the interior of the building to be visualized on the screen.

4. The method for providing 3D GIS web services according to claim 2, wherein the step of transmitting involves searching for a sub-cube that corresponds to a request of the web client if the request includes information about the interior of the building to be visualized on the screen.

5. The method for providing 3D GIS web services according to claim 3, wherein the request of the web client includes information about a location and shooting direction of the camera, and the server searches for a sub-cube based on the location and shooting direction of the camera.

6. The method for providing 3D GIS web services according to claim 4, wherein the request of the web client includes information about a location and shooting direction of the camera, and the server searches for a sub-cube and a relevant surface based on the location and shooting direction of the camera.

7. The method for providing 3D GIS web services according to claim 1, wherein the step of transmitting involves searching for a sub-cube and a relevant surface that correspond to a request of the web client if the request includes information about the interior of the building to be visualized on the screen.

8. The method for providing 3D GIS web services according to claim 7, wherein the request of the web client includes information about a location and shooting direction of the camera, and the server searches for a sub-cube based on the location and shooting direction of the camera.

9. The method for providing 3D GIS web services according to claim 1, wherein in the step of transmitting, the information to be transmitted undergoes occlusion culling.

10. The method for providing 3D GIS web services according to claim 2, wherein in the step of transmitting, the information to be transmitted undergoes occlusion culling.

11. The method for providing 3D GIS web services according to claim 3, wherein in the step of transmitting, the information to be transmitted undergoes occlusion culling.

12. The method for providing 3D GIS web services according to claim 4, wherein in the step of transmitting, the information to be transmitted undergoes occlusion culling.

13. The method for providing 3D GIS web services according to claim 5, wherein in the step of transmitting, the information to be transmitted undergoes occlusion culling.

14. The method for providing 3D GIS web services according to claim 6, wherein in the step of transmitting, the information to be transmitted undergoes occlusion culling.

15. The method for providing 3D GIS web services according to claim 1, wherein in the step of transmitting, the information to be transmitted undergoes occlusion culling.

16. The method for providing 3D GIS web services according to claim 7, wherein in the step of transmitting, the information to be transmitted undergoes occlusion culling.

17. The method for providing 3D GIS web services according to claim 8, wherein in the step of transmitting, the information to be transmitted undergoes occlusion culling.

* * * * *